(12) United States Patent
Dunand et al.

(10) Patent No.: US 9,969,905 B1
(45) Date of Patent: May 15, 2018

(54) TRANSIENT LIQUID PHASE (TLP) BONDING OF NICKEL BASED ALLOYS BY FORMING AN ALUMINUM-TITANIUM COATING AND SUBSEQUENT HEAT TREATMENT

(71) Applicant: NORTHWESTERN UNIVERSITY, Evanston, IL (US)

(72) Inventors: David C. Dunand, Evanston, IL (US); Dinc Erdeniz, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 703 days.

(21) Appl. No.: 14/592,503

(22) Filed: Jan. 8, 2015

Related U.S. Application Data

(60) Provisional application No. 61/925,432, filed on Jan. 9, 2014.

(51) Int. Cl.
*B32B 15/04* (2006.01)
*C23C 12/00* (2006.01)
*C09J 1/00* (2006.01)
*B32B 7/12* (2006.01)

(52) U.S. Cl.
CPC .............. *C09J 1/00* (2013.01); *B32B 7/12* (2013.01); *B32B 15/04* (2013.01); *C23C 12/00* (2013.01); *Y10T 442/3463* (2015.04)

(58) Field of Classification Search
CPC .......... B32B 15/01; B32B 15/04; C23C 12/00
USPC ....................................... 428/678; 228/111.5
See application file for complete search history.

(56) References Cited

U.S. PATENT DOCUMENTS 5,028,385 A * 7/1991 Baldi ..................... B22F 7/002
149/109.6

* cited by examiner

*Primary Examiner* — Humera N Sheikh
*Assistant Examiner* — Xiaobei Wang
(74) *Attorney, Agent, or Firm* — Locke Lord LLP; Tim Tingkang Xia, Esq.

(57) ABSTRACT

Certain aspects of the invention provides a transient liquid phase (TLP) bonding structure, including Ni based alloys and a TLP bonded layer formed by pack cementation on the Ni based alloys using a pack composition. In one embodiment, the pack composition includes 57 wt. % of aluminum oxide powder, 30 wt. % of Ti powder, 10 wt. % of Ni-50 wt. % Al alloy powder and 3 wt. % of ammonium chloride powder. The Ni based alloys may be Ni-20 wt. % Cr alloys. In certain embodiments, pack cementation is performed on the Ni based alloys under argon for an hour using the pack composition to form a coating. Then the structure is sonicated in acetone for 2 hours, and then annealed under vacuum at about 1200° C. for 2 days to form the TLP bonding structure, which has a uniform γ' phase distribution with identical compositions and properties at its bonding regions.

25 Claims, 13 Drawing Sheets

US 9,969,905 B1

TRANSIENT LIQUID PHASE (TLP) BONDING OF NICKEL BASED ALLOYS BY FORMING AN ALUMINUM-TITANIUM COATING AND SUBSEQUENT HEAT TREATMENT

CROSS-REFERENCE TO RELATED PATENT APPLICATION

This application claims priority to and the benefit of, pursuant to 35 U.S.C. § 119(e), U.S. provisional patent application Ser. No. 61/925,432, filed Jan. 9, 2014, entitled "TRANSIENT LIQUID PHASE BONDING OF NICKEL BASED ALLOYS BY FORMING AN ALUMINUM-TITANIUM COATING AND SUBSEQUENT HEAT TREATMENT," by David C. Dunand and Dinc Erdeniz, which is incorporated herein in its entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

STATEMENT AS TO RIGHTS UNDER FEDERALLY-SPONSORED RESEARCH

This invention was made with government support under contract W91CRB-10-1-0004 (Johns Hopkins University, Prime Recipient, Subcontract No. 2001175094) awarded by the Defense Advanced Research Projects Agency (DARPA). The government has certain rights in the invention.

FIELD OF THE INVENTION

The present invention relates generally to transient liquid phase (TLP) bonding technology, and more particularly to creating TLP bonding structures between nickel (Ni) based alloys, using aluminum (Al) and titanium (Ti) as the major alloying elements.

BACKGROUND OF THE INVENTION

Transient liquid phase (TLP) bonding is a technique that has been widely used for the joining of various alloys by an interlayer, which melts and diffuses in to the parts that are being joined. As the diffusion occurs the composition of the interlayer changes from eutectic to off-eutectic and solidifies, resulting in a solid bond with a higher melting temperature than the bonding temperature. This technique has found many applications in the industry, especially with Ni-based alloys that are widely used in the aerospace industry. For TLP bonding of Ni alloys, there are many commercially available interlayer materials, which are mainly based on Ni—B, Ni—Si, or Ni—Mn alloy systems.

Therefore, a heretofore unaddressed need exists in the art to address the aforementioned deficiencies and inadequacies.

SUMMARY OF THE INVENTION

One aspect of the disclosure relates to a pack composition for bonding Ni based alloys. In certain embodiments, the pack composition includes:

(a) $Al_2O_3$ powder comprising a first wt. % of the pack composite;
(b) Ti powder comprising a second wt. % of the pack composite;
(c) Ni—Al alloy powder comprising a third wt. % of the pack composite, where the Ni includes about 50% weight percentage of the Ni—Al alloy powders; and
(d) $NH_4Cl$ powder comprising a fourth wt. % of the pack composite, where the pack composition is configured to form a coating on the Ni based alloys, and the coating is configured to form a transient liquid phase (TLP) bonded layer on the Ni based alloys by homogenization.

In certain embodiments, the first wt. % is at most about 57 wt. %; the second wt. % is at most about 30 wt. %; the third wt. % is at most about 10 wt. %; and the fourth wt. % is at most about 3 wt. %.

Another aspect of the disclosure provides a transient liquid phase (TLP) bonding structure. In certain embodiments, the TLP bonding structure includes: (a) a plurality of woven alloy structures, each including Ni alloys; and (b) a TLP bonded layer formed between the plurality of woven alloy structures by pack cementation using the pack composition as described above. The TLP bonding structure has a uniform γ' phase distribution with identical compositions and properties at bonding regions between the TLP bonded layer and the woven alloy structures.

In certain embodiments, the Ni based alloys include Ni-chromium (Cr) alloys, and the Cr includes at most about 20% weight percentage of the Ni—Cr alloys. In certain embodiments, the TLP bonded layer has a composition of Ni-20Cr-3Ti-1Al.

In a further aspect of the disclosure, a TLP bonding structure includes: (a) Ni alloys; and (b) a TLP bonded layer formed on the Ni based alloys by pack cementation using a pack composition. In certain embodiments, the pack composition includes:

(i) $Al_2O_3$ powder comprising a first wt. % of the pack composite;
(ii) Ti powder comprising a second wt. % of the pack composite;
(iii) Ni—Al alloy powder comprising a third wt. % of the pack composite, where the Ni includes about 50% weight percentage of the Ni—Al alloy powders; and
(iv) $NH_4Cl$ powder comprising a fourth wt. % of the pack composite.

In certain embodiments, the TLP bonding structure has a uniform γ' phase distribution with identical compositions and properties at bonding regions between the TLP bonded layer and the Ni based alloys.

In certain embodiments, the Ni based alloys include woven alloy structures containing Ni.

In certain embodiments, the Ni based alloys include Ni—Cr alloys, and the Cr includes at most about 20% weight percentage of the Ni—Cr alloys. In certain embodiments, the TLP bonded layer has a composition of Ni-20Cr-3Ti-1Al.

In certain embodiments, the first wt. % is at most about 57 wt. %; the second wt. % is at most about 30 wt. %; the third wt. % is at most about 10 wt. %; and the fourth wt. % is at most about 3 wt. %.

In certain embodiments, the TLP bonding structure is formed by:

(a) performing pack cementation on the Ni based alloys under argon at a predetermined first temperature of about 900-1100° C. for a first period of time using the pack composition to form a coating on the Ni based alloys;

(b) sonicating the Ni based alloys with the coating in acetone for a second period of time; and (c) annealing the sonicated Ni based alloys with coating under vacuum at a predetermined second temperature of about 1120-1300° C. for a third period of time to form the TLP bonded layer on the Ni based alloys.

In certain embodiments, the coating includes a Ni—Cr—Al—Ti coating.

In certain embodiments, the predetermined first temperature is about 1000° C., the predetermined second temperature is about 1200° C., the first period of time is about 1 hour, the second period of time is about 2 hours, and the third period of time is about 2 days A further aspect of the disclosure relates to a method for bonding Ni based alloys, which includes:

(a) performing pack cementation on the Ni based alloys under a noble gas environment at a first temperature for a first period of time using a pack composition as described above to form a coating on the Ni based alloys;

(b) sonicating the Ni based alloys with the coating in acetone for a second period of time; and (c) annealing the sonicated Ni based alloys with the coating under vacuum at a second temperature for a third period of time to form a TLP bonding structure having a TLP bonded layer formed on the Ni based alloys.

In certain embodiments, the TLP bonding structure formed by the method as described above has a uniform γ' phase distribution with identical compositions and properties at bonding regions between the TLP bonded layer and the Ni based alloys.

In certain embodiments, the Ni based alloys used in the method include woven alloy structures containing Ni.

In certain embodiments, the Ni based alloys used in the method include Ni—Cr alloys, and the Cr includes at most about 20% weight percentage of the Ni—Cr alloys. In certain embodiments, the coating includes a Ni—Cr—Al—Ti coating. In certain embodiments, the TLP bonded layer has a composition of Ni-20Cr-3Ti-1Al.

In certain embodiments, the noble gas is argon.

In certain embodiments, the first temperature is a predetermined temperature at about 900-1100° C., and the second temperature is a predetermined temperature at about 1120-1300° C. In certain embodiments, the first temperature is about 1000° C., the second temperature is about 1200° C., the first period of time is about 1 hour, the second period of time is about 2 hours, and the third period of time is about 2 days.

The TLP bonding structure and the method as described above may be applicable in any bonding structures, such as bonding wires in wire-woven Ni alloys.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
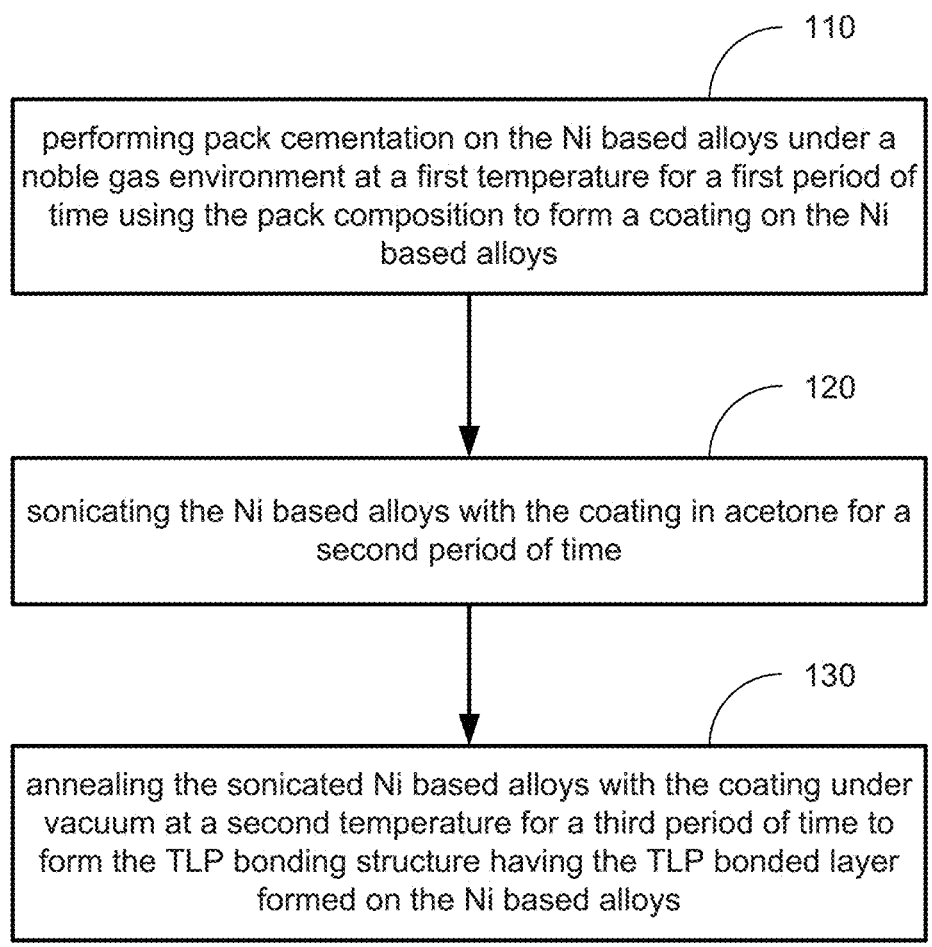
FIG. 1 shows a flowchart of a method for bonding Ni based alloys according to certain embodiments of the disclosure.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Definitions

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "carrying," "having," "containing," "involving," and the like are to be understood to be open-ended, i.e., to mean including but not limited to.

As used herein, if any, the term "scanning electron microscope" or its abbreviation "SEM" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, a "nanostructure" refers to an object of intermediate size between molecular and microscopic (micrometer-sized) structures. In describing nanostructures, the sizes of the nanostructures refer to the number of dimensions on the nanoscale. For example, nanotextured surfaces have one dimension on the nanoscale, i.e., only the thickness of the surface of an object is between 0.1 and 1000 nm. Sphere-like nanoparticles have three dimensions on the nanoscale, i.e., the particle is between 0.1 and 1000 nm in each spatial dimension. A list of nanostructures includes, but not limited to, nanoparticle, nanocomposite, quantum dot, nanofilm, nanoshell, nanofiber, nanoring, nanorod, nanowire, nanotube, and so on.

Overview of the Invention

Certain aspect of the present invention relates to, among other things, a pack composition for bonding Ni based alloys, which includes Ni—Al alloy powders, $Al_2O_3$ powders, Ti powders, and $NH_4Cl$ powders. Specifically, in certain embodiments, the pack composition includes:

(a) $Al_2O_3$ powder comprising a first wt. % of the pack composite;

(b) Ti powder comprising a second wt. % of the pack composite;

(c) Ni—Al alloy powder comprising a third wt. % of the pack composite, where the Ni comprises about 50% weight percentage of the Ni—Al alloy powders; and (d) $NH_4Cl$ powder comprising a fourth wt. % of the pack composite, where the pack composition is configured to form a coating on the Ni based alloys, and the coating is configured to form a TLP bonded layer on the Ni based alloys by homogenization.

In certain embodiments, the first wt. % is at most about 57 wt. %; the second wt. % is at most about 30 wt. %; the third wt. % is at most about 10 wt. %; and the fourth wt. % is at most about 3 wt. %.

Another aspect of the disclosure provides a TLP bonding structure. In certain embodiments, the TLP bonding structure includes: (a) Ni alloys; and (b) a TLP bonded layer formed on the Ni based alloys by pack cementation using the pack composition as described above. In certain embodiments, the Ni based alloys include woven alloy structures containing Ni. In certain embodiments, the Ni based alloys include Ni—Cr alloys, such as Ni—Cr alloy wires. In certain embodiments, the Ni—Cr alloys may be Ni-20 wt. % Cr alloys. In certain embodiments, the coating is a Ni—Cr—Al—Ti deposition coating. In certain embodiments, the TLP bonded layer has a composition of Ni-20Cr-3Ti-1Al.

In a further aspect, a method for bonding Ni based alloys is provided. FIG. 1 shows a flowchart of a method for bonding Ni based alloys according to certain embodiments of the disclosure. As shown in FIG. 1, the method includes the following steps.

At step 110, pack cementation is performed on the Ni based alloys under a noble gas environment at a first temperature for a first period of time using the pack composition to form a coating (or an interlayer) on the Ni based alloys. In certain embodiments, the noble gas may be argon. In certain embodiments, the first temperature is a predetermined temperature at about 900-1100° C. In one embodiment, the first temperature may be about 1000° C. In certain embodiments, the first period of time may be about 1 hour.

In certain embodiments, the coating or the interlayer formed on the Ni based alloys by performing pack cementation is a Ni—Cr—Al—Ti deposition coating. In certain embodiments, the coating may include three layers, including: (i) a Ni$_2$AlTi layer on the top, (ii) a Ni$_3$Al layer in the middle, and (iii) a Cr-rejection layer at the bottom. The 3-layer coating may be defined as an interlayer, which will subsequently form the TLP bonded layer after the full homogenization steps at steps 120 and 130.

At step 120, the Ni based alloys with the coating (or the interlayer) are sonicated in acetone for a second period of time. In certain embodiments, the second period of time may be about 2 hours.

At step 130, annealing is performed to the sonicated Ni based alloys with the coating (or the interlayer) area under vacuum at a second temperature for a third period of time to form the TLP bonding structure. In certain embodiments, the second temperature is a predetermined temperature at about 1120-1300° C. In certain embodiments, the second temperature may be about 1200° C. In certain embodiments, the third period of time may be about 2 days.

In certain embodiments, the pack cementation technique is used to create an Al—Ti rich coating on a structure that was woven from 200 micrometer diameter Ni-20 wt. % Cr wires. Upon annealing at about 1200° C. for 2 days, the wires bonded at their contact points by the TLP mechanism and interdiffusion between the bond region and the wire made the composition homogenous. Pack cementation is a very simple technique that can be applied to Ni alloys with various geometries.

In certain embodiments, the method as described above uses a unique uniformly distributed Al—Ti rich interlayer, which is created using the pack composition in a pack cementation process. Although pack cementation is commonly used for coating, Ti is not typically a choice for coating, as it is prone to oxidation. Ti is used in special cases to create a wear-resistant coating on steels, as in steel Ti can react with C or N from the parent material to create TiC or TiN. In Ni alloys, however, the amount of C and N are minimal, and hence coating of Ni alloys with Ti is not a process with any obvious benefit or application. Although other methods are available to coat Ni alloys with Al—Ti, pack cementation results in superior uniformity and lower complexity and thus cost.

In certain embodiment, as a first step in the disclosed process, the goal of creating an interlayer by coating a Ni alloy with Al—Ti is performed by pack cementation. Then, the second component in the disclosed method is a sonication process to remove pack remnants. The third component of the disclosed method is an annealing process in order to obtain TLP bonding. TLP bonding requires a liquid phase formation via eutectic melting. Typically, there is a known low eutectic between Ni—Al—Ti (900° C. melting point). However, the phase transformation temperatures are strongly influenced and changed by many other elements present in alloys, such as Cr.

In certain embodiments, the TLP bonding structure and the method as described above utilizes the unexpected liquid formation during TLP bonding using a Ni—Cr—Al—Ti coating or interlayer formed via the deposition of said Al and Ti by pack cementation. Such liquid formation, required for diffusion of elements and subsequent bonding, is not guaranteed by the presence of Al and Ti. Unlike existing TLP bonding techniques, the method unexpectedly creates bonding regions with the same material properties as the parent phase, following a homogenization step at a temperature of 1200° C. for 2 days. In comparison to the conventional non-beneficial Ti coating on Ni alloys at elevated temperatures, Al—Ti coating may provide some oxidation resistance due to the presence of Al. Thus, it is the novel step to provide a combined Al—Ti coating on Ni alloys by pack cementation with a TLP bonding process at 1200° C. (optionally followed by homogenization) that is the key to forming the bonded Ni alloy with superior properties.

These and other aspects of the present invention are further described below.

IMPLEMENTATIONS AND EXAMPLES OF THE INVENTION

Without intent to limit the scope of the invention, exemplary instruments, apparatus, methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Example

As described above, the method may be used for the transient liquid phase bonding (TLP) of Ni-based alloy wires (or other Ni-based substrates) with an Al—Ti rich coating. The Al—Ti rich coating is deposited on the substrates by the pack cementation technique, a chemical vapor deposition process, which allows simultaneous deposition of Al and Ti. In this example, the method is applied with structures woven from Ni-20 wt. % Cr wires, which are alloyed with Al and Ti by pack cementation and homogenization. It should be particularly noted, however, that the described method is applicable to all Ni alloys. Both Al and Ti elements area added simultaneously and created an Al—Ti rich coating on the Ni alloy. Upon annealing at 1200° C. for 2 days, the alloy wires get bonded at their contact points, clearly by the formation of a liquid phase, as evidenced by the filling of empty spaces between wires, where the surface tension is higher. Hence the liquid filled in with the help of the capillary effect.

Al—Ti coating has not been applied before to Ni-based parts for the purpose of bonding. TLP bonding requires the use of an interlayer (i.e., a coating) that would melt at the bonding temperature, diffuse in to bonded parts, and solidify isothermally as the diffusion changes the composition at the bonding region. In certain embodiments, the interlayer may be applied in various forms including but not limited to powders, sheets, and coatings.

For the bonding of Ni-based alloys, there are many commercially available interlayer alloys that are mainly based on Ni—B, Ni—Si, or Ni—Mn alloy systems. Ni—Al—Ti system also has a low melting point eutectic.

In certain embodiments, structures woven from Ni-20 wt. % Cr wires were coated with an Al—Ti rich layer by pack cementation. For this process, a powder mixture (pack) that consisted of 57 wt. % $Al_2O_3$, 30 wt. % Ti, 10 wt. % Ni-50 wt. % Al and 3 wt. % $NH_4Cl$ was prepared. Then 25 g of the powder mixture was poured in an alumina crucible and the Ni-20 wt. % Cr weave was buried into this mixture. The crucible, now holding the sample within the pack, was placed in a tube furnace that was preheated to 1000° C. and flushed with argon to prevent oxidation. Subsequent to a 1-hour treatment, the crucible was taken out of the furnace and the specimen was sonicated in acetone for 2 hours to remove pack remnants. The resulting coated specimen was encapsulated in a quartz tube under vacuum and annealed at 1200° C. for 2 days.

In certain embodiments, specimens sectioned with a diamond blade saw were mounted in epoxy and prepared for optical microscopy by standard metallographic techniques.

Figure 2:
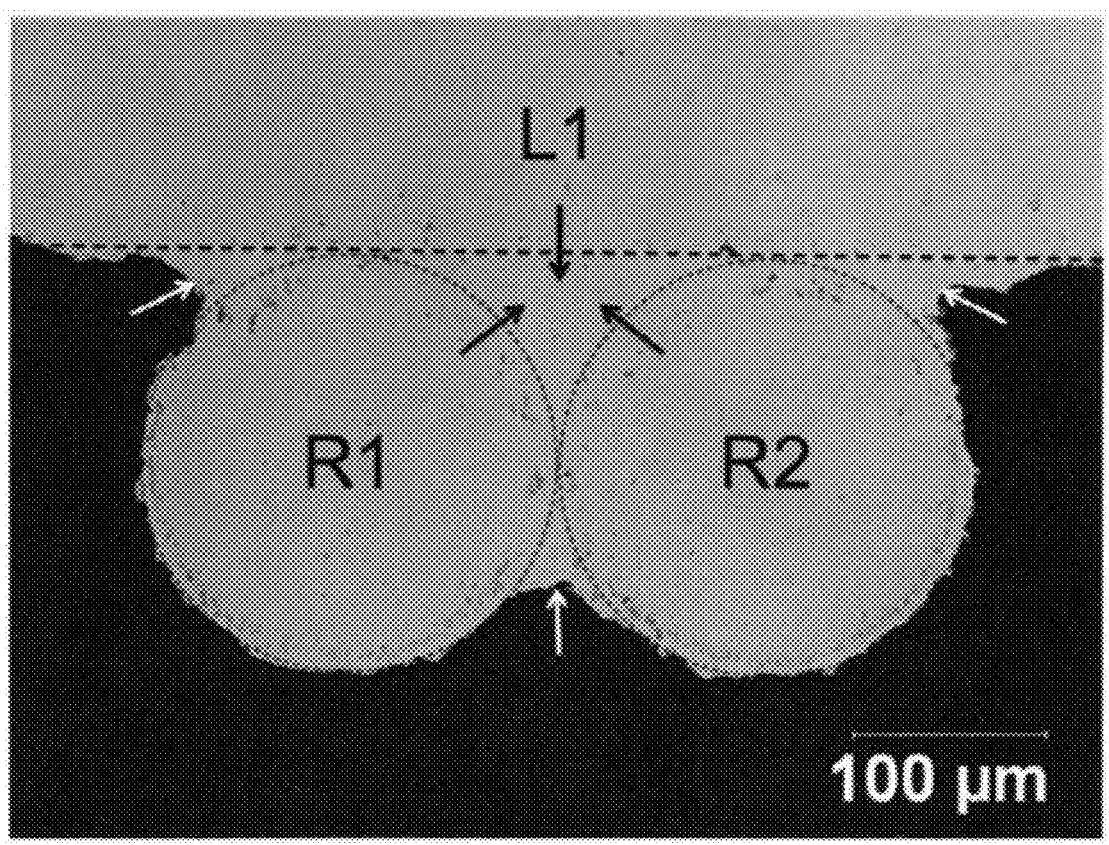
FIG. 2 shows an optical microscope image of the cross section of three wires bonded together in a Ni—Cr—Al—Ti weave with an interlayer according to certain embodiments of the disclosure.

FIG. 2 shows an optical microscope image of the cross section of three wires bonded together in a Ni—Cr—Al—Ti weave with an interlayer according to certain embodiments of the disclosure. As shown in FIG. 2, the three wires include 2 radial wires labeled R1 and R2, and 1 longitudinal wire labeled L1. The three wires were bonded together in a Ni—Cr—Al—Ti weave with an interlayer in the as-polished condition, and no etching was performed. As shown in FIG. 2, the outline of the original wires is shown with dotted lines, and the solidified liquid phase forming the bond between the wires is marked with arrows. The liquid phase filled the space between the three wires creating a strong bond between them, which appears to be of the same composition as the wire, as a result of interdiffusion between the solidified liquid phase and the wires.

Figure 3:
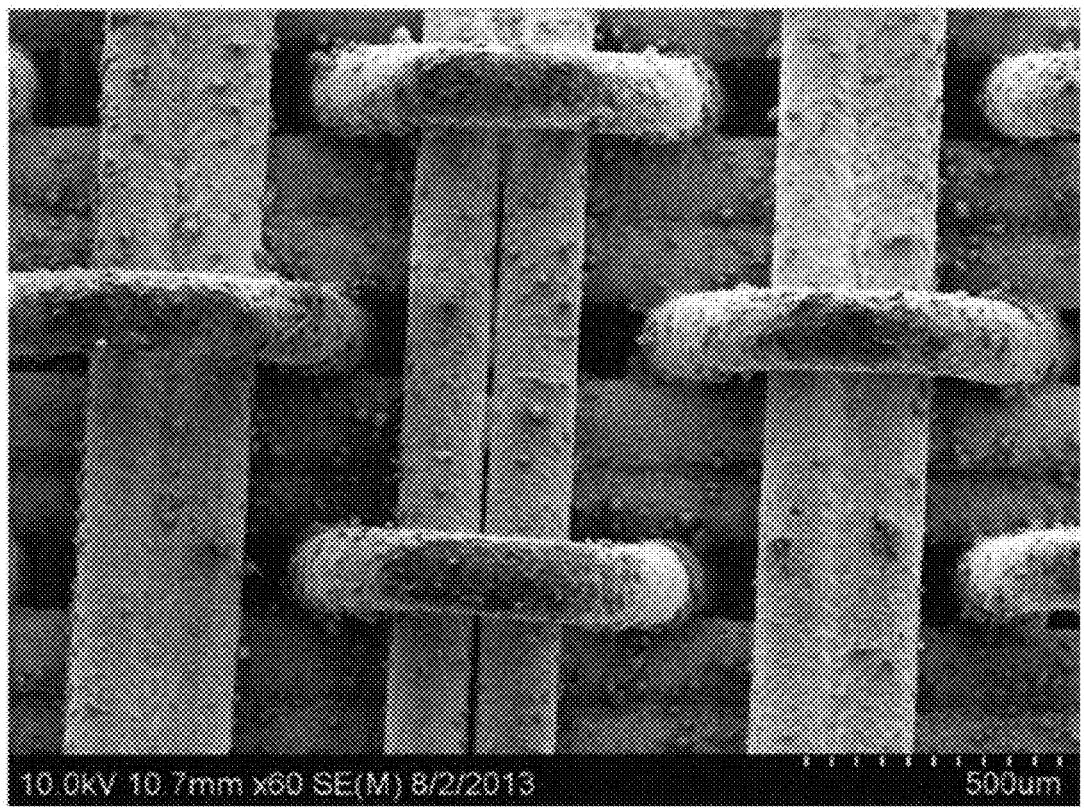
FIG. 3 shows an SEM image of the top view of a bonded Ni—Cr—Al—Ti woven structure according to certain embodiments of the disclosure.

FIG. 3 shows an SEM image of the top view of a bonded Ni—Cr—Al—Ti woven structure according to certain embodiments of the disclosure. Bonding between wire couples is clearly shown in FIG. 3. As shown in FIG. 3, bonding is noted between fill wire couples (vertical) running through the Z loops, as well as between warp wire couples (horizontal) that are one layer below the fill wires. Bonded regions are also seen between Z and warp wires.

Figure 4:
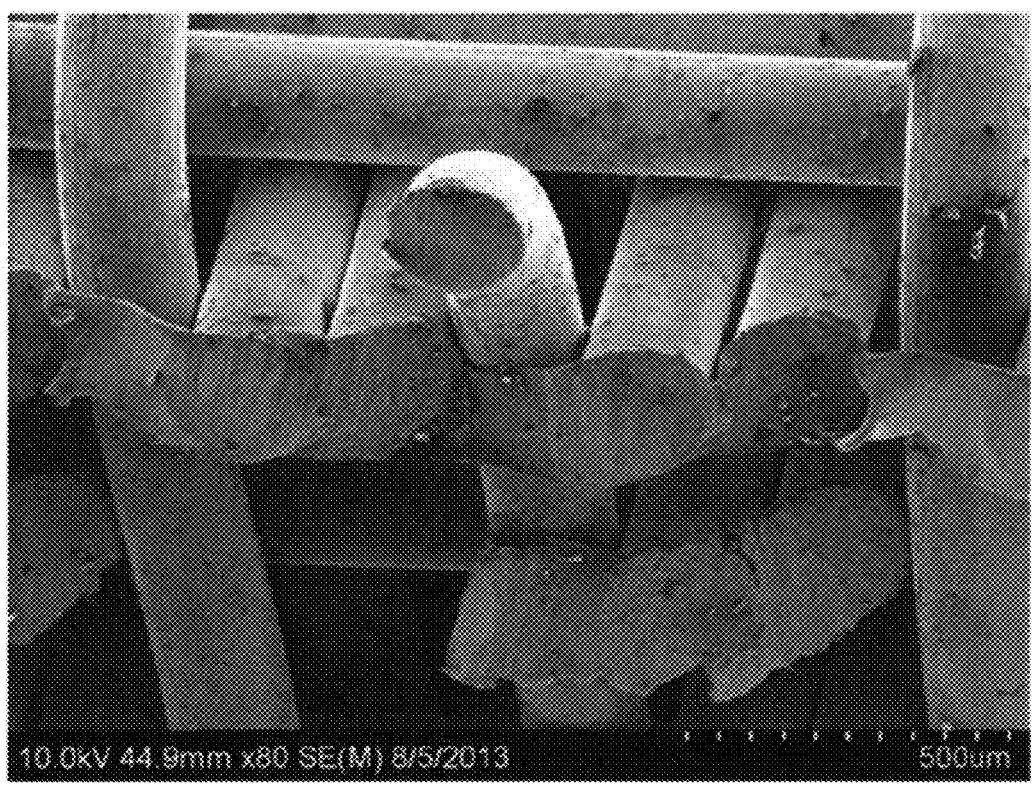
FIG. 4 shows an SEM image showing the cross-section of an as-received Ni—Cr woven structure according to certain embodiments of the disclosure.
Figure 5:
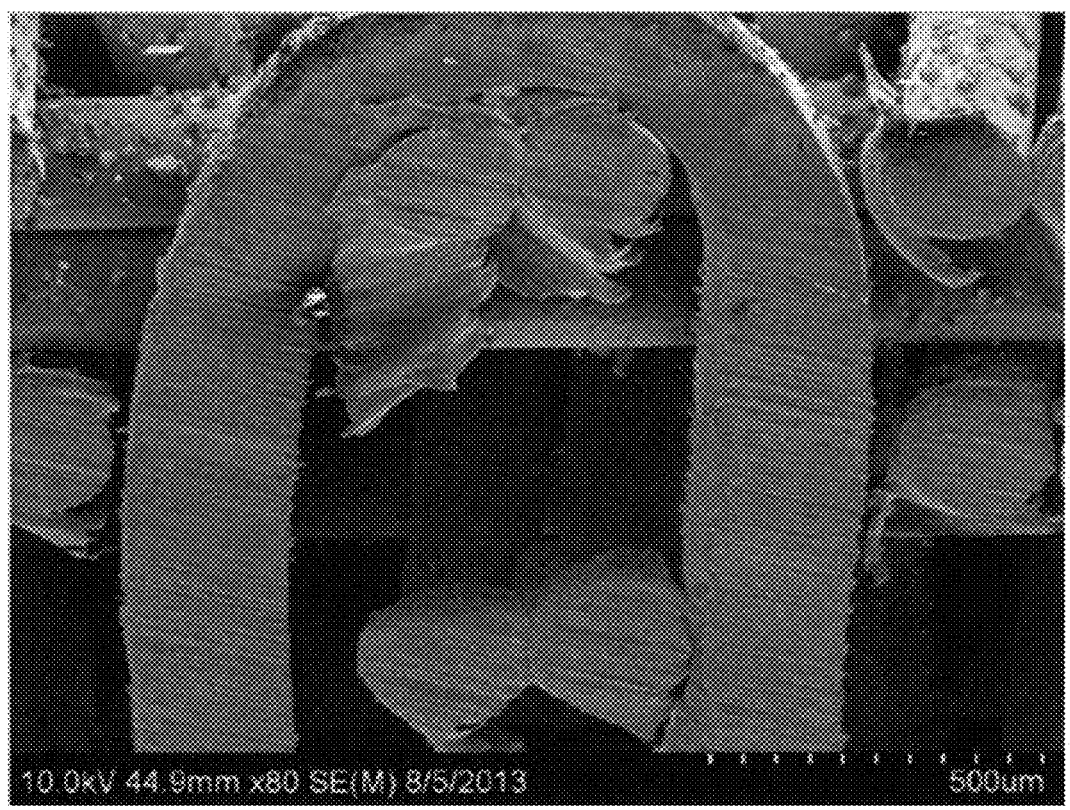
FIG. 5 shows an SEM image showing the cross-section of an as-coated (no TLP annealing) Ni—Cr—Al—Ti woven structure according to certain embodiments of the disclosure.

For comparison, SEM images of the as-received Ni—Cr and as-coated Ni—Cr—Al—Ti woven structures are given in FIGS. 4 and 5. FIG. 4 shows an SEM image showing the cross-section of an as-received Ni—Cr woven structure according to certain embodiments of the disclosure, and FIG. 5 shows an SEM image showing the cross-section of an as-coated (no TLP annealing) Ni—Cr—Al—Ti woven structure according to certain embodiments of the disclosure. Both FIGS. 4 and 5 show no bonding between wires.

Detailed imaging studies have been conducted with a Scanning Electron Microscope (SEM) and it was observed that the bonding has occurred everywhere in the sample uniformly. Detail images are given in FIGS. 6-10.

Figure 6:
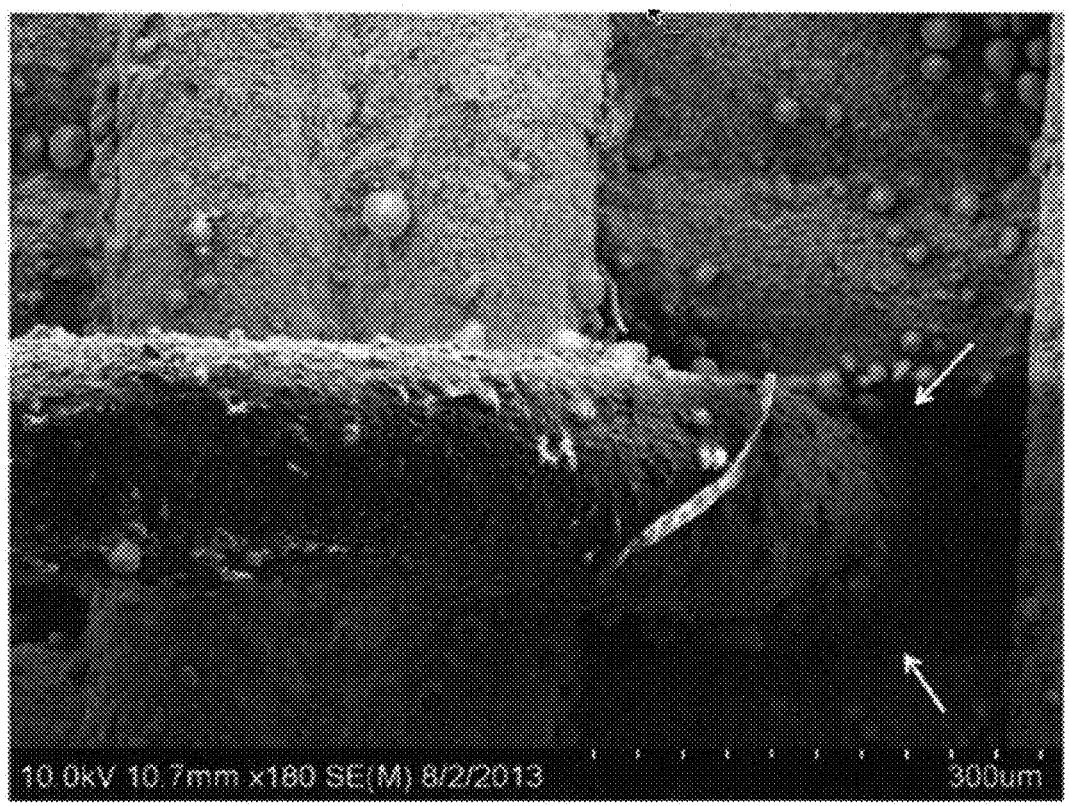
FIG. 6 shows an SEM image showing the TLP bonded region between Z and warp wires (marked with arrows) according to certain embodiments of the disclosure.
Figure 7:
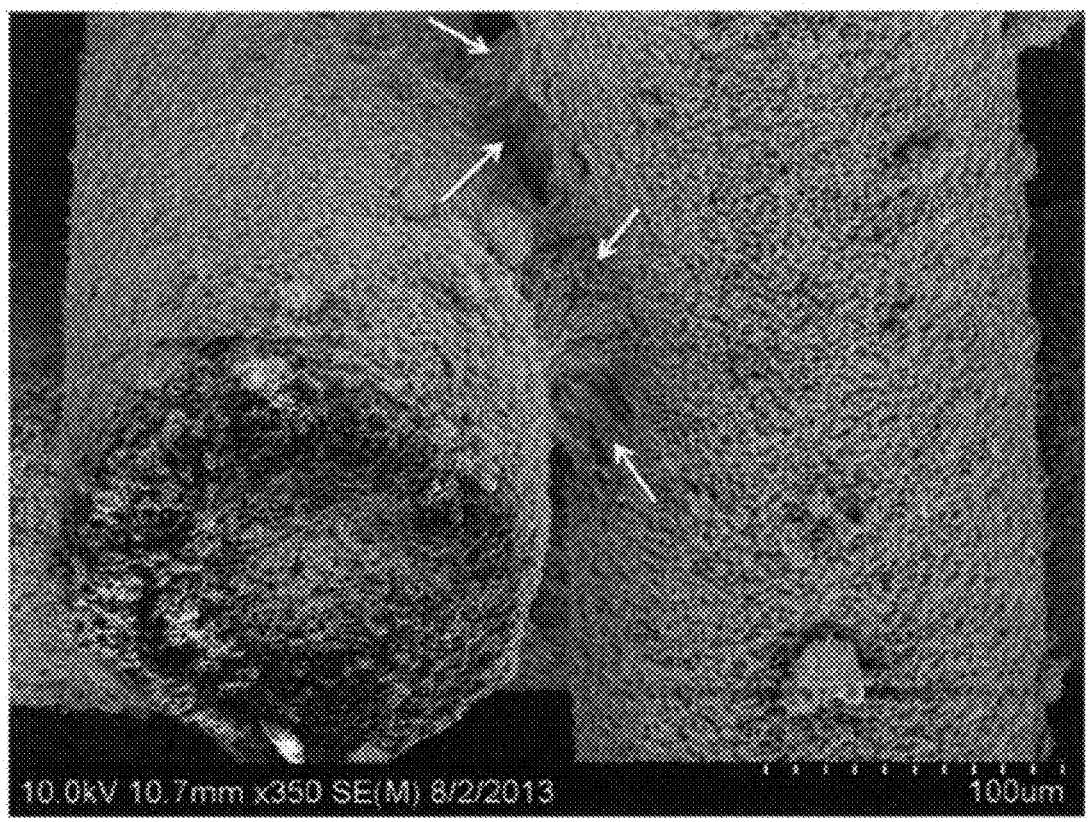
FIG. 7 shows an SEM image showing the TLP bonded region between fill and Z wires according to certain embodiments of the disclosure.
Figure 8:
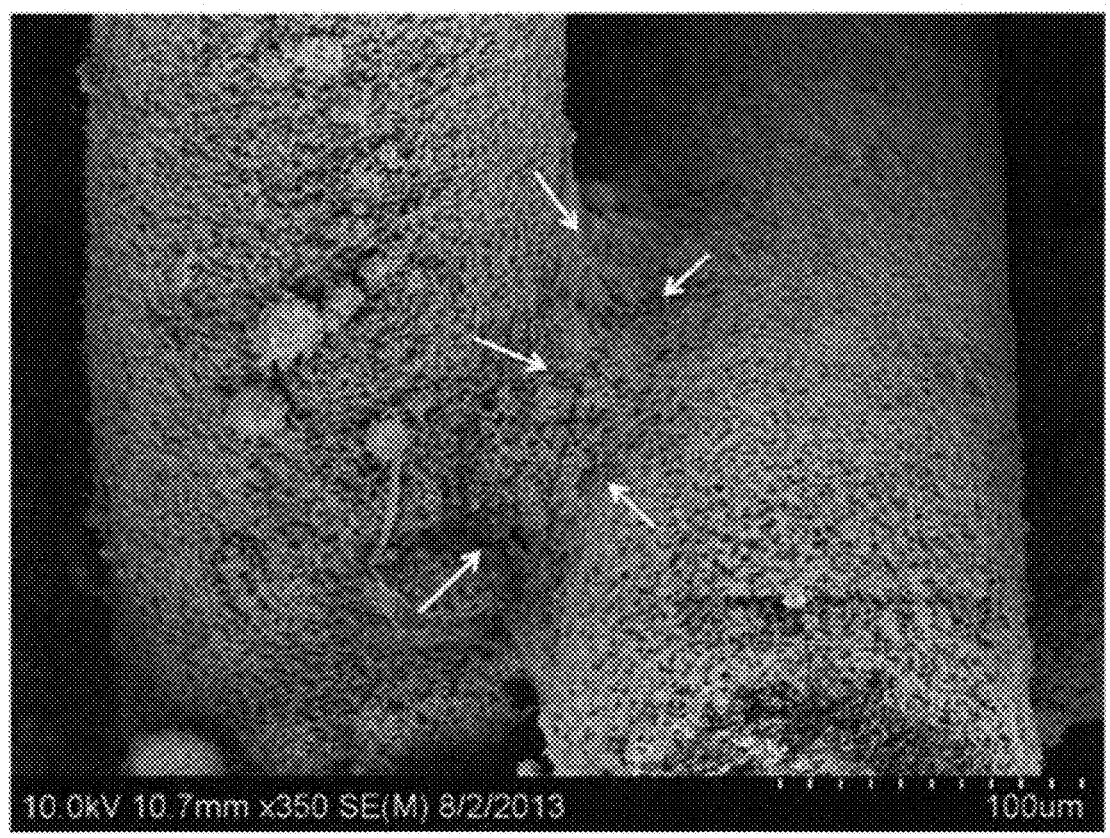
FIG. 8 shows an SEM image showing the TLP bonded region between fill and Z wires according to certain embodiments of the disclosure.
Figure 9:
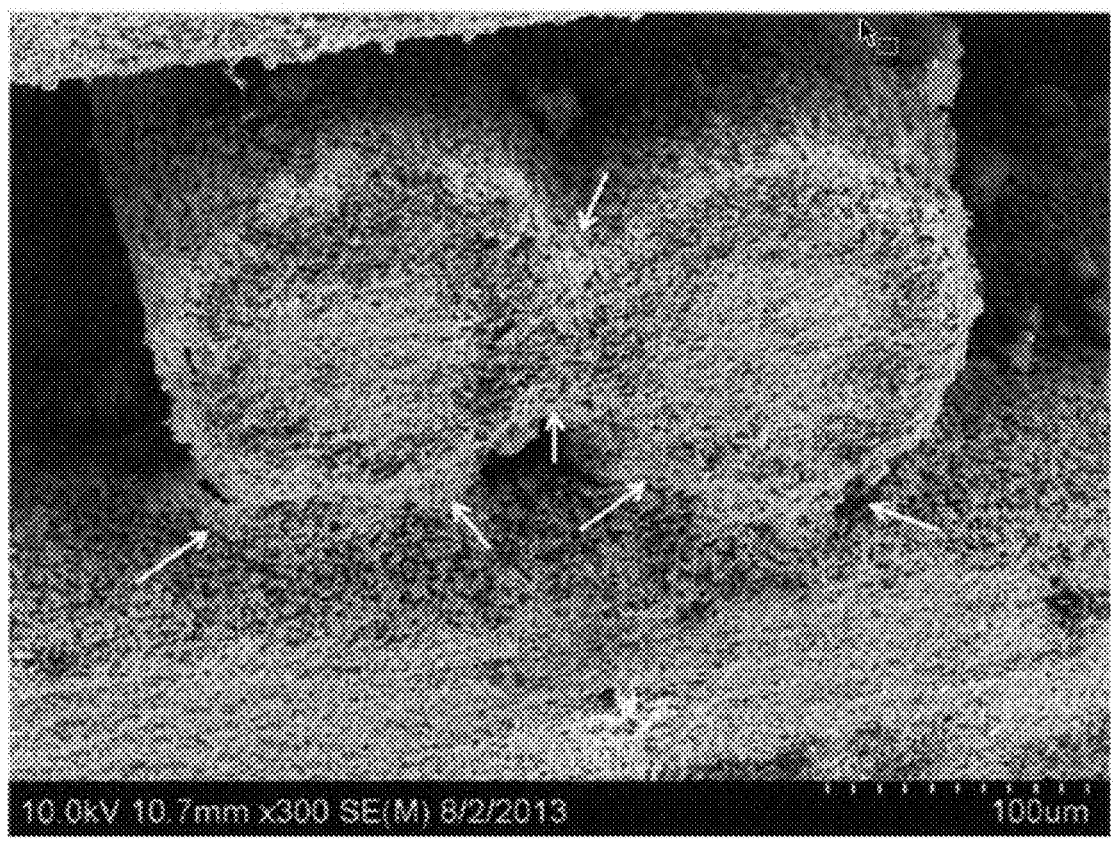
FIG. 9 shows an SEM image showing TLP bonded regions between two fill wires and between fill and warp wires according to certain embodiments of the disclosure.

Specifically, FIG. 6 shows an SEM image showing the TLP bonded region between Z and warp wires (marked with arrows) according to certain embodiments of the disclosure. FIG. 7 shows an SEM image showing the TLP bonded region between fill and Z wires according to certain embodiments of the disclosure. FIG. 8 shows an SEM image showing the TLP bonded region between fill and Z wires according to certain embodiments of the disclosure. FIG. 9 shows an SEM image showing TLP bonded regions between two fill wires and between fill and warp wires according to certain embodiments of the disclosure.

Figure 10:
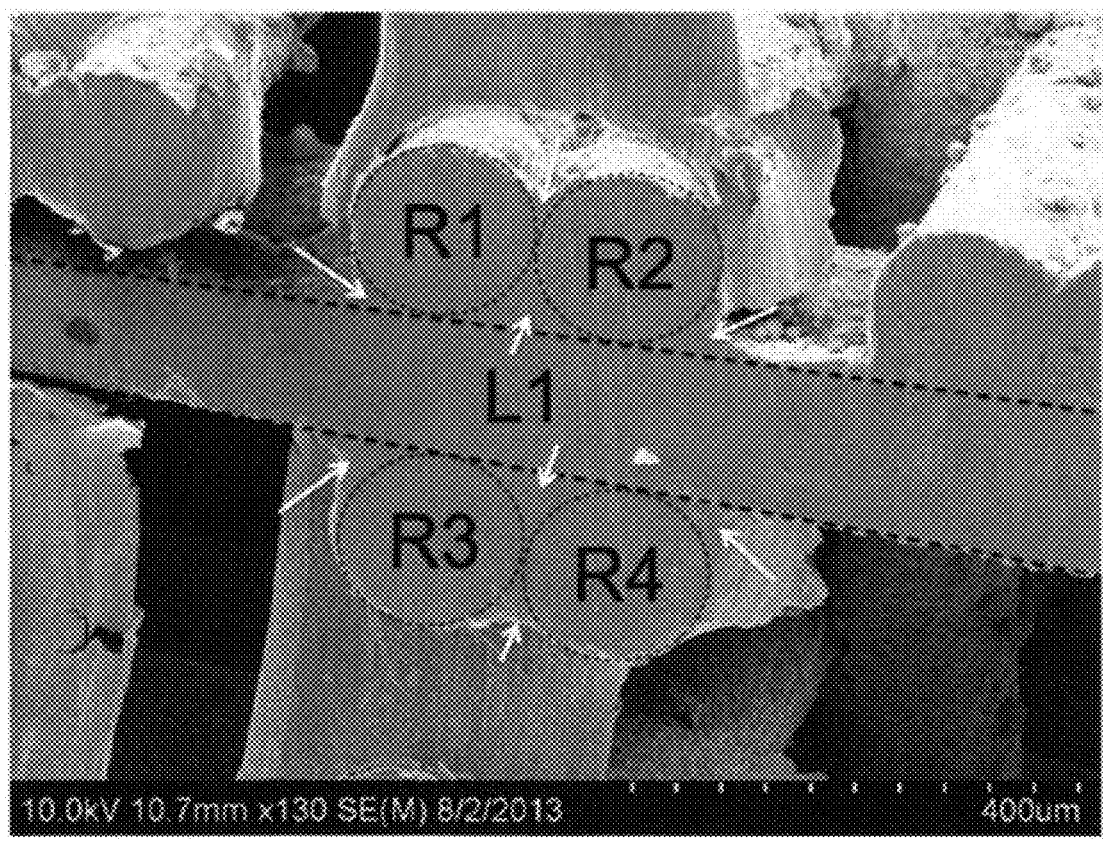
FIG. 10 shows an SEM image showing 5 wires bonded together in a Ni—Cr—Al—Ti weave with an interlayer according to certain embodiments of the disclosure.

FIG. 10 shows an SEM image showing 5 wires bonded together in a Ni—Cr—Al—Ti weave with an interlayer according to certain embodiments of the disclosure. As shown in FIG. 10, the 5 wires include 4 radial wires labeled R1 through R4, and 1 wire longitudinal labeled L1. The outline of the original wires is shown with dotted lines, and the solidified liquid phase is marked with arrows.

It should be noted that, although various aspects of the disclosed bonding method have been shown and described, modifications may occur to those skilled in the art upon reading the specification.

Figure 11:
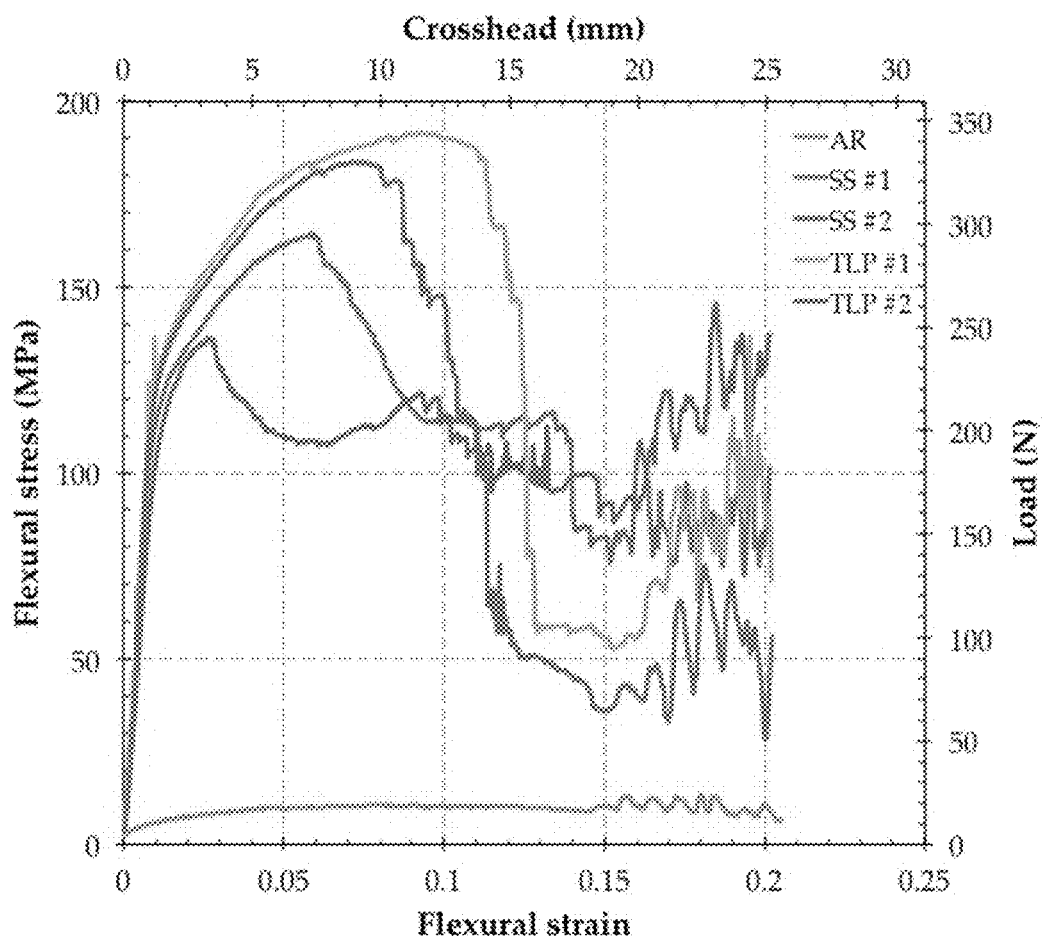
FIG. 11 shows stress-strain curves showing flexural behavior of as-received, solid-state (SS) bonded and transient-liquid phase (TLP) bonded woven structures according to certain embodiments of the disclosure.

FIG. 11 shows stress-strain curves showing flexural behavior of as-received, solid-state (SS) bonded and transient-liquid phase (TLP) bonded woven structures according to certain embodiments of the disclosure. As shown in FIG. 11, the stress-strain curves show the flexural behavior of solid-state (SS) bonded Ni-20Cr-3Ti-1Al, transient-liquid phase (TLP) bonded Ni-20Cr-3Ti-1Al, and as-received Ni-20Cr woven structures. Two samples for each processing condition were tested and the results are consistent. The TLP bonded structures reached approx. 20% higher maximum strength than the SS bonded structures. This is due to the higher bonding efficiency achieved with the TLP technique. The only difference between the sample pairs (TLP #1 vs TLP #2 and SS #1 vs SS#2) is the points at which the failure started. This is due to the total number of bonds in a sample, which is directly related with the spacing between wires in the as-received material and can be improved by the manufacturer. However, it should be noted that both TLP samples started failing at higher strains (and stresses) than the SS samples, once again indicating the higher efficiency of bonding.

Figure 12:
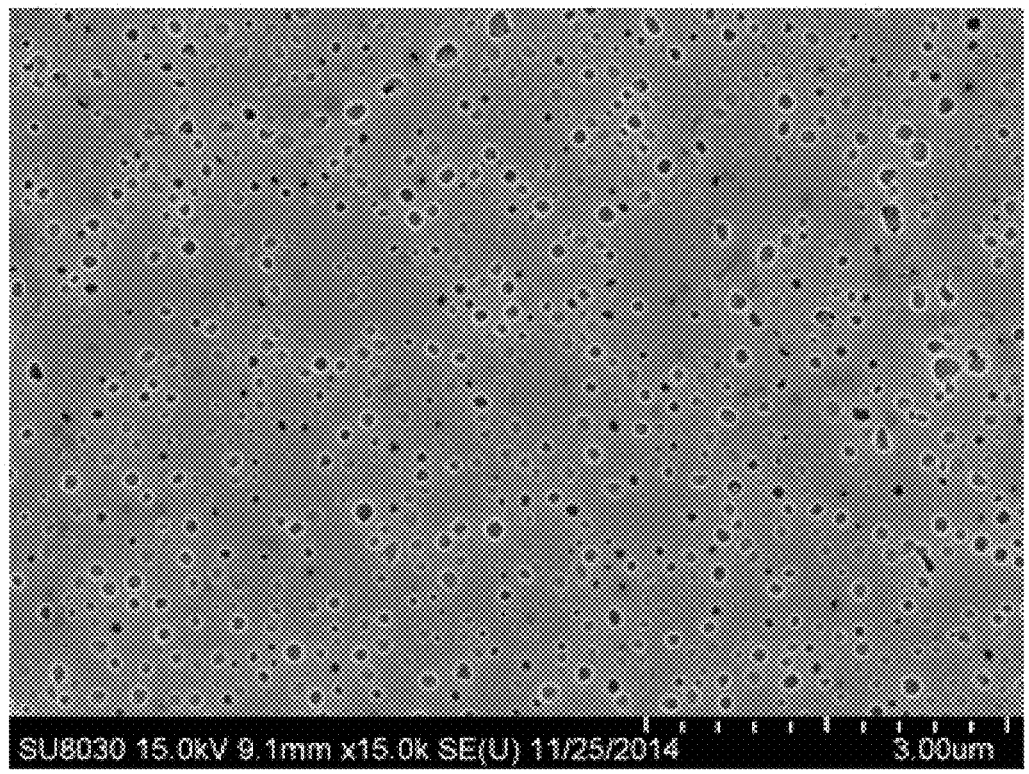
FIG. 12 shows γ' precipitates in a TLP bonded woven structure according to certain embodiments of the disclosure.
Figure 13:
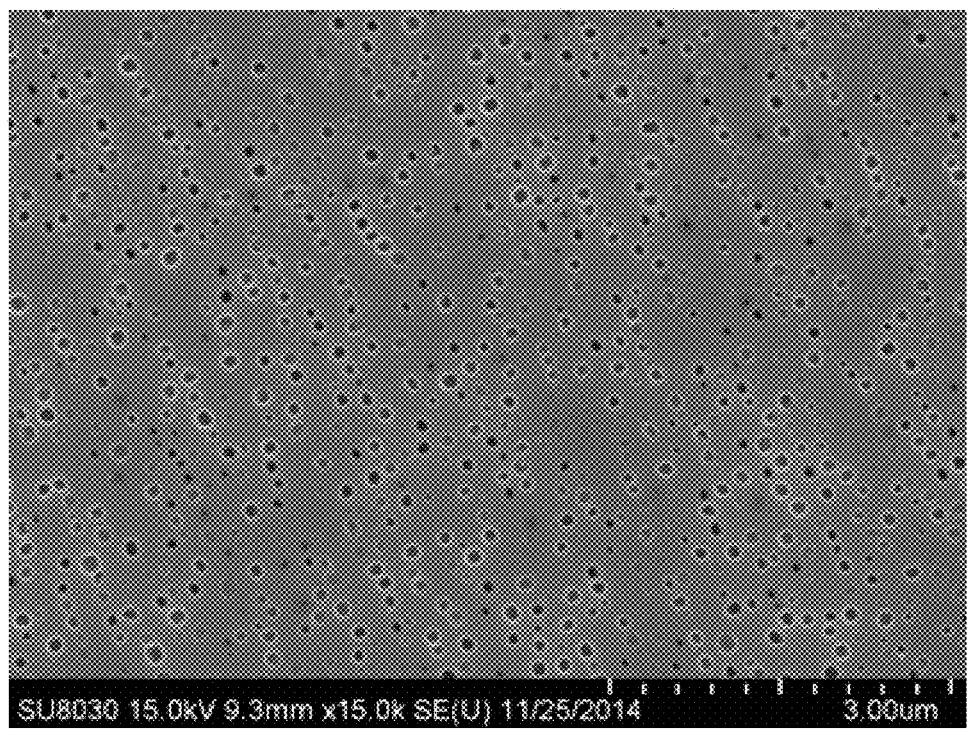
FIG. 13 shows γ' precipitates in a TLP bonded woven structure according to certain embodiments of the disclosure.

Microstructural analyses showed that the TLP bonded structures have a uniform γ' phase (that is responsible for high temperature strength of Ni-based superalloys) distribution throughout the sample, where the γ' particle size and morphology are identical in wires and bonding region between the wires, as shown in FIGS. 12 and 13. FIG. 12 shows γ' precipitates in a TLP bonded woven structure according to certain embodiments of the disclosure, where the image was taken from a wire. FIG. 13 shows γ' precipitates in a TLP bonded woven structure according to certain embodiments of the disclosure, where the image was taken from bonding region between two wires. This provides a very unique advantage for this technique, since the alternative methods result in bonding regions with different compositions and properties, whereas the technique described here creates γ' strengthened bonds with identical compositions and properties with the parent material. The precipitate distribution in the SS bonded structures was similar to the TLP bonded structures.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A transient liquid phase (TLP) bonding structure, comprising:
   (a) a plurality of woven alloy structures, each comprising nickel (Ni) based alloys; and
   (b) a TLP bonded layer formed between the plurality of woven alloy structures by pack cementation using a pack composition, wherein the pack composition comprises:
      (i) aluminum oxide ($Al_2O_3$) powder comprising a first weight percent (wt. %) of the pack composite;
      (ii) titanium (Ti) powder comprising a second wt. % of the pack composite;
      (iii) Ni—Al alloy powder comprising a third wt. % of the pack composite, wherein the Ni comprises about 50% weight percentage of the Ni—Al alloy powders; and
      (iv) ammonium chloride ($NH_4Cl$) powder comprising a fourth wt. % of the pack composite,
   wherein the TLP bonding structure has a uniform γ' phase distribution with identical compositions and properties at bonding regions between the TLP bonded layer and the woven alloy structures.

2. The pack composition of claim 1, wherein:
   the first wt. % is at most about 57 wt. %;
   the second wt. % is at most about 30 wt. %;
   the third wt. % is at most about 10 wt. %; and
   the fourth wt. % is at most about 3 wt. %.

3. The TLP bonding structure of claim 1, wherein the Ni based alloys comprise Ni-chromium (Cr) alloys, and the Cr comprises at most about 20% weight percentage of the Ni—Cr alloys.

4. The TLP bonding structure of claim 3, wherein the TLP bonded layer has a composition of Ni-20Cr-3Ti-1Al.

5. A method for bonding nickel (Ni) based alloys, comprising:
   (a) performing pack cementation on the Ni based alloys under argon at a predetermined first temperature of about 900-1100° C. for about 1 hour of time using a pack composition to form a coating on the Ni based alloys, wherein the pack composition comprises:
      (i) aluminum oxide ($Al_2O_3$) powder comprising a first weight percent (wt. %) of the pack composite;
      (ii) titanium (Ti) powder comprising a second wt. % of the pack composite;
      (iii) Ni—Al alloy powder comprising a third wt. % of the pack composite, wherein the Ni comprises about 50% weight percentage of the Ni—Al alloy powders; and
      (iv) ammonium chloride ($NH_4Cl$) powder comprising a fourth wt. % of the pack composite;
   (b) sonicating the Ni based alloys with the coating in acetone for about 2 hours; and
   (c) annealing the sonicated Ni based alloys with the coating under vacuum at a predetermined second temperature of about 1120-1300° C. for about 2 days to form a transient liquid phase (TLP) bonding structure having a TLP bonded layer formed on the Ni based alloys, wherein the TLP bonding structure has a uniform γ' phase distribution with identical compositions and properties at bonding regions between the TLP bonded layer and the Ni based alloys.

6. The method of claim 5, wherein the predetermined first temperature is about 1000° C., and the predetermined second temperature is about 1200° C.

7. A transient liquid phase (TLP) bonding structure, comprising:
   (a) nickel (Ni) based alloys; and
   (b) a TLP bonded layer formed on the Ni based alloys by pack cementation using a pack composition, wherein the pack composition comprises:
      (i) aluminum oxide ($Al_2O_3$) powder comprising a first weight percent (wt. %) of the pack composite;
      (ii) titanium (Ti) powder comprising a second wt. % of the pack composite;
      (iii) Ni—Al alloy powder comprising a third wt. % of the pack composite, wherein the Ni comprises about 50% weight percentage of the Ni—Al alloy powders; and
      (iv) ammonium chloride ($NH_4Cl$) powder comprising a fourth wt. % of the pack composite.

8. The TLP bonding structure of claim 7, having a uniform γ' phase distribution with identical compositions and properties at bonding regions between the TLP bonded layer and the Ni based alloys.

9. The TLP bonding structure of claim 7, wherein the Ni based alloys comprise woven alloy structures containing Ni.

10. The TLP bonding structure of claim 7, wherein the Ni based alloys comprise Ni-chromium (Cr) alloys, and the Cr comprises at most about 20% weight percentage of the Ni—Cr alloys.

11. The TLP bonding structure of claim 10, wherein the TLP bonded layer has a composition of Ni-20Cr-3Ti-1Al.

12. The TLP bonding structure of claim 7, wherein:
   the first wt. % is at most about 57 wt. %;
   the second wt. % is at most about 30 wt. %;
   the third wt. % is at most about 10 wt. %; and
   the fourth wt. % is at most about 3 wt. %.

13. The TLP bonding structure of claim 7, being formed by:
   (a) performing pack cementation on the Ni based alloys under argon at a predetermined first temperature of about 900-1100° C. for a first period of time using the pack composition to form a coating on the Ni based alloys;
   (b) sonicating the Ni based alloys with the coating in acetone for a second period of time; and
   (c) annealing the sonicated Ni based alloys with the coating under vacuum at a predetermined second temperature of about 1120-1300° C. for a third period of time to form the TLP bonded layer on the Ni based alloys.

14. The TLP bonding structure of claim 13, wherein the coating comprises a Ni—Cr—Al—Ti coating.

15. The TLP bonding structure of claim 13, wherein the predetermined first temperature is about 1000° C., the predetermined second temperature is about 1200° C., the first period of time is about 1 hour, the second period of time is about 2 hours, and the third period of time is about 2 days.

16. A method for bonding nickel (Ni) based alloys, comprising:
(a) performing pack cementation on the Ni based alloys under a noble gas environment at a first temperature for a first period of time using a pack composition to form a coating on the Ni based alloys, wherein the pack composition comprises:
  (i) aluminum oxide ($Al_2O_3$) powder comprising a first weight percent (wt. %) of the pack composite;
  (ii) titanium (Ti) powder comprising a second wt. % of the pack composite;
  (iii) Ni—Al alloy powder comprising a third wt. % of the pack composite, wherein the Ni comprises about 50% weight percentage of the Ni—Al alloy powders; and
  (iv) ammonium chloride ($NH_4Cl$) powder comprising a fourth wt. % of the pack composite;
(b) sonicating the Ni based alloys with the coating in acetone for a second period of time; and
(c) annealing the sonicated Ni based alloys with the interlayer under vacuum at a second temperature for a third period of time to form a transient liquid phase (TLP) bonding structure having a TLP bonded layer formed on the Ni based alloys.

17. The method of claim 16, wherein the TLP bonding structure has a uniform γ' phase distribution with identical compositions and properties at bonding regions between the TLP bonded layer and the Ni based alloys.

18. The method of claim 16, wherein the Ni based alloys comprise woven alloy structures containing Ni.

19. The method of claim 16, wherein the Ni based alloys comprise Ni-chromium (Cr) alloys, and the Cr comprises at most about 20% weight percentage of the Ni—Cr alloys.

20. The method of claim 19, wherein the coating comprises a Ni—Cr—Al—Ti coating.

21. The method of claim 19, wherein the TLP bonded layer has a composition of Ni-20Cr-3Ti-1Al.

22. The method of claim 16, wherein the noble gas is argon.

23. The method of claim 16, wherein:
the first wt. % is at most about 57 wt. %;
the second wt. % is at most about 30 wt. %;
the third wt. % is at most about 10 wt. %; and
the fourth wt. % is at most about 3 wt. %.

24. The method of claim 16, wherein the first temperature is a predetermined temperature at about 900-1100° C., and the second temperature is a predetermined temperature at about 1120-1300° C.

25. The method of claim 24, wherein the first temperature is about 1000° C., the second temperature is about 1200° C., the first period of time is about 1 hour, the second period of time is about 2 hours, and the third period of time is about 2 days.

* * * * *